United States Patent
Chitrapura et al.

(10) Patent No.: US 7,941,420 B2
(45) Date of Patent: May 10, 2011

(54) METHOD FOR ORGANIZING STRUCTURALLY SIMILAR WEB PAGES FROM A WEB SITE

(75) Inventors: Krishna Prasad Chitrapura, Bangalore (IN); Krishna Leela Poola, Karnataka (IN)

(73) Assignee: Yahoo! Inc., Sunnyvale, CA (US)

( * ) Notice: Subject to any disclaimer, the term of this patent is extended or adjusted under 35 U.S.C. 154(b) by 938 days.

(21) Appl. No.: 11/838,351

(22) Filed: Aug. 14, 2007

(65) Prior Publication Data

US 2009/0049062 A1    Feb. 19, 2009

(51) Int. Cl.
*G06F 17/30* (2006.01)

(52) U.S. Cl. ........ 707/709; 707/741; 707/748; 707/754; 707/758; 707/797

(58) Field of Classification Search .................. 707/709, 707/711, 737, 999.102, 741, 748, 754, 758, 707/797
See application file for complete search history.

(56) References Cited

U.S. PATENT DOCUMENTS

| | | | |
|---|---|---|---|
| 5,999,929 A | 12/1999 | Goodman | |
| 6,119,124 A * | 9/2000 | Broder et al. | 707/999.103 |
| 6,487,555 B1 * | 11/2002 | Bharat et al. | 707/999.01 |
| 6,523,026 B1 | 2/2003 | Gillis | |
| 6,629,097 B1 | 9/2003 | Keith | |
| 6,654,741 B1 | 11/2003 | Cohen et al. | |
| 6,658,423 B1 * | 12/2003 | Pugh et al. | 707/999.003 |
| 6,895,552 B1 | 5/2005 | Balabanovic et al. | |
| 7,098,815 B1 * | 8/2006 | Samuels et al. | 707/999.102 |
| 7,363,311 B2 | 4/2008 | Fujita et al. | |
| 7,440,968 B1 | 10/2008 | Oztekin et al. | |
| 7,599,931 B2 * | 10/2009 | Shi et al. | 707/999.004 |
| 2002/0159642 A1 | 10/2002 | Whitney | |
| 2003/0140033 A1 | 7/2003 | Lizuka et al. | |
| 2003/0149581 A1 | 8/2003 | Chaudhri et al. | |
| 2003/0187837 A1 | 10/2003 | Culliss | |
| 2004/0260676 A1 * | 12/2004 | Douglis et al. | 707/3 |
| 2005/0004910 A1 | 1/2005 | Trepess | |
| 2005/0010599 A1 | 1/2005 | Kake et al. | |
| 2005/0033733 A1 * | 2/2005 | Shadmon et al. | 707/2 |
| 2006/0041635 A1 * | 2/2006 | Alexander et al. | 709/218 |
| 2006/0064471 A1 * | 3/2006 | Hewett et al. | 709/219 |
| 2006/0123230 A1 * | 6/2006 | Hewett et al. | 713/164 |
| 2006/0195297 A1 | 8/2006 | Kubota et al. | |
| 2007/0050338 A1 | 3/2007 | Strohm et al. | |
| 2007/0094615 A1 | 4/2007 | Endo et al. | |
| 2007/0130318 A1 | 6/2007 | Roast | |
| 2008/0044016 A1 * | 2/2008 | Henzinger | 380/201 |

(Continued)

*Primary Examiner* — Charles Rones
*Assistant Examiner* — Rezwanul Mahmood
(74) *Attorney, Agent, or Firm* — Hickman Palermo Truong & Becker LLP

(57) ABSTRACT

Techniques are described for organizing structurally similar web pages for a website. Fingerprints are made of the structure of the web pages using shingling by placing the web page's HTML tags and attributes in sequence and encoding the tags and attributes using a standard encoding technique. Fixed-size portions of the encoded sequence are taken and a set of values extracted using independent hash functions to compute the shingles. Alternatively, a DOM tree representation of HTML of the web page is generated and each path of the DOM tree encoded and values extracted using independent hash functions to compute the shingles. A specified number of shingles are retained as the fingerprint. The pages are then clustered based upon the URL and the similarity of the shingles. The clustered hierarchal organization of pages is further pruned by various criteria including similarity of shingles or support of the cluster node in the hierarchy.

28 Claims, 6 Drawing Sheets

U.S. PATENT DOCUMENTS

| | | |
|---|---|---|
| 2008/0072140 A1 | 3/2008 | Vydiswaran et al. |
| 2008/0114800 A1* | 5/2008 | Gazen et al. ............... 707/101 |
| 2008/0134220 A1* | 6/2008 | Weiss et al. ............... 719/329 |
| 2008/0162541 A1 | 7/2008 | Oresic et al. |
| 2008/0281816 A1 | 11/2008 | Kim |
| 2009/0024606 A1* | 1/2009 | Schilit et al. ............... 707/5 |
| 2009/0043797 A1* | 2/2009 | Dorie et al. ............... 707/101 |
| 2009/0063538 A1* | 3/2009 | Chitrapura et al. ........... 707/102 |
| 2009/0070872 A1 | 3/2009 | Cowings et al. |
| 2009/0157644 A1* | 6/2009 | Gollapudi et al. ............... 707/5 |
| 2009/0164411 A1* | 6/2009 | Dasdan et al. ............... 707/5 |
| 2009/0171986 A1* | 7/2009 | Chitrapura et al. ........... 707/100 |
| 2009/0182821 A1* | 7/2009 | Allen et al. ............... 707/100 |
| 2010/0161717 A1* | 6/2010 | Albrecht et al. ............... 709/203 |
| 2010/0169329 A1* | 7/2010 | Frieder et al. ............... 707/752 |
| 2010/0198864 A1* | 8/2010 | Ravid et al. ............... 707/797 |
| 2010/0287466 A1* | 11/2010 | Ravid et al. ............... 707/758 |

\* cited by examiner

FIG. 2A

```
201   <HTML>
203     <HEAD>
205       <TITLE>THE DOCUMENT OBJECT MODEL</TITLE>
        </HEAD>
207     <BODY>
209       <TABLE>
211         <TR>
213           <TD>ITEM 1</TD>
215           <TD>ITEM 2</TD>
            </TR>
217         <TR>
              <TD>ITEM 3</TD>
            </TR>
          </TABLE>
        </BODY>
      </HTML>
```

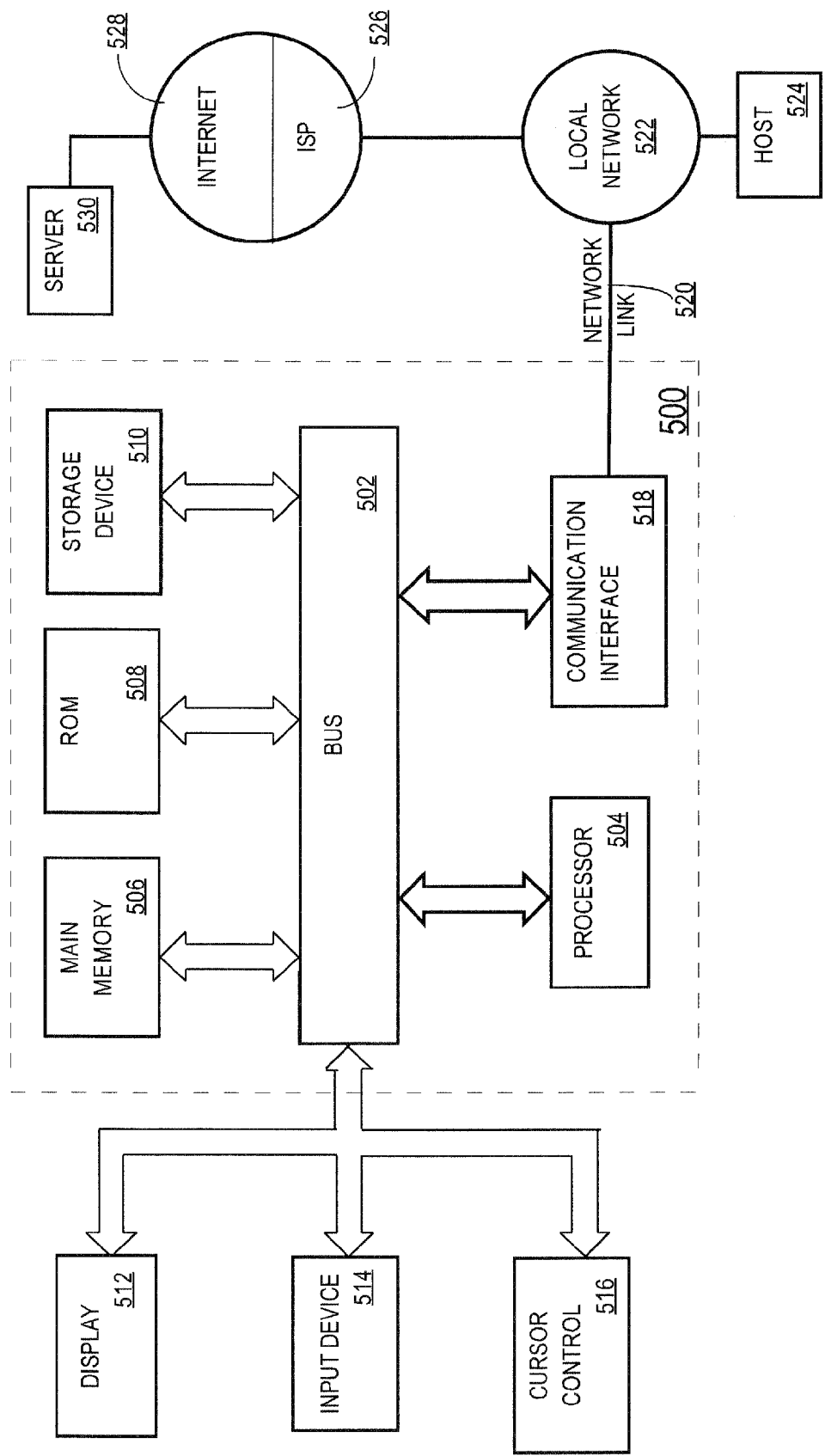

METHOD FOR ORGANIZING STRUCTURALLY SIMILAR WEB PAGES FROM A WEB SITE

CROSS REFERENCE TO RELATED APPLICATIONS

This application is related to U.S. patent application Ser. No. 11/481,734 filed on Jul. 5, 2006, entitled "TECHNIQUES FOR CLUSTERING STRUCTURALLY SIMILAR WEB PAGES" which is incorporated by reference in its entirety for all purposes as if originally set forth herein.

This application is also related to U.S. patent application Ser. No. 11/847,989 filed on Aug. 30, 2007, entitled "A METHOD FOR NORMALIZING DYNAMIC URLS OF WEB PAGES THROUGH HIERARCHICAL ORGANIZATION OF URLS FROM A WEB SITE" which is incorporated by reference in its entirety for all purposes as if originally set forth herein.

FIELD OF THE INVENTION

The present invention relates to web documents, specifically, hierarchically organizing structurally similar web documents from a web site.

BACKGROUND

There is a vast wealth of information in documents on the Internet such as telephone directories, stock tables, or product catalogs. This information is far more useful once the information is extracted and then aggregated, managed, filtered and redistributed based upon a particular search query. However, extraction of this information is difficult because the information is formatted primarily for a web user to read. In order to solve this dilemma, a procedure called a wrapper was developed. A wrapper translates the information from the format found on a specific web document to a form that may be collated, managed, and redistributed. However, wrappers are often generated manually. Generating wrappers manually is time-consuming and subject to many errors.

As a result, a process called wrapper induction was created. Wrapper induction automated the creation of wrappers. This process begins by learning the structure of a group of structurally similar documents. Then the mappings of labels to the various sections of the documents are learned though human annotation or another automated process. Once the mappings are learned, wrappers are generated. The wrappers allow the information to be extracted. Wrapper induction allows information to be extracted from structurally similar documents with high precision. However, in order for wrapper induction to perform efficiently, structurally similar documents must first be grouped together.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A is a diagram of an HTML page with tags, according to an embodiment of the invention;

FIG. 5 is a block diagram of a computer system on which embodiments of the invention may be implemented.

DETAILED DESCRIPTION

Figure 1:
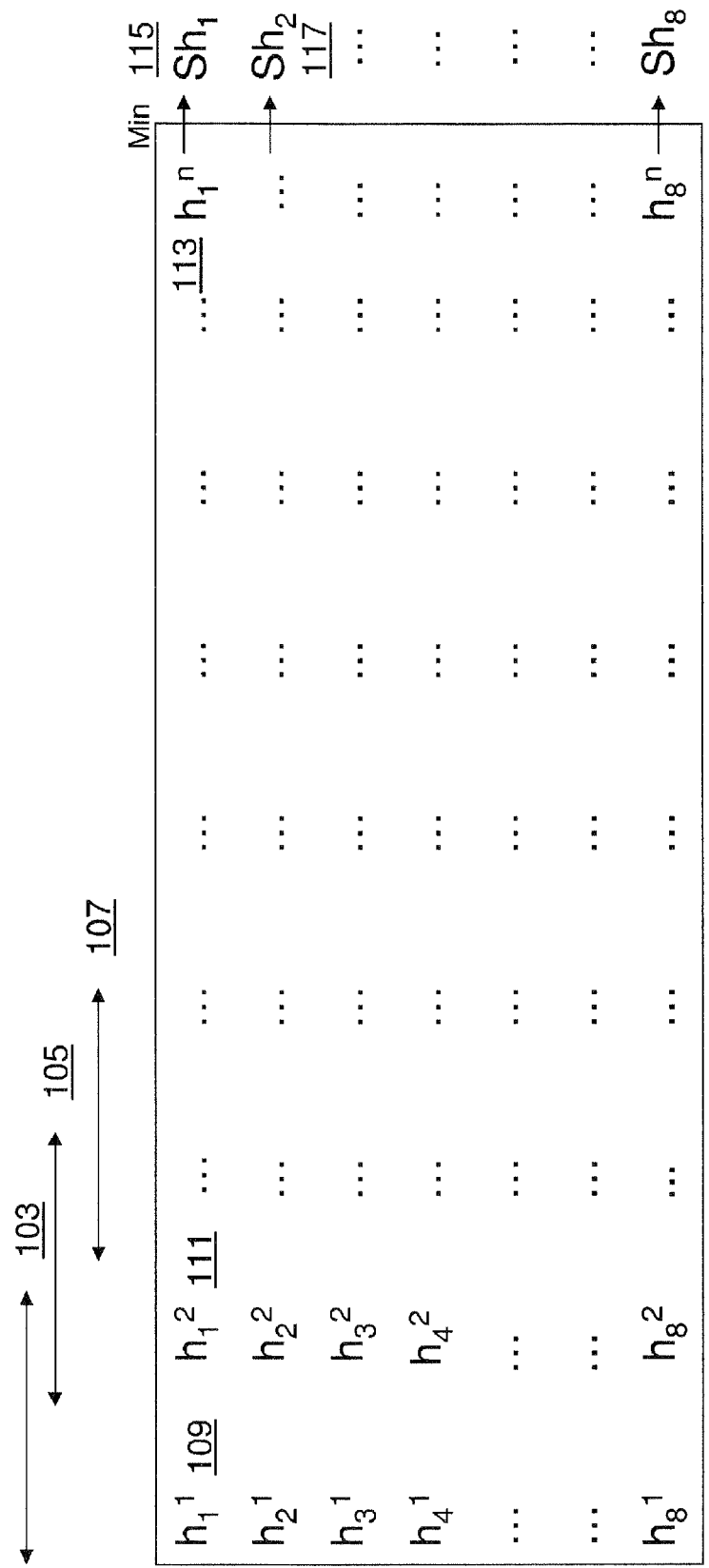
FIG. 1 is a diagram that illustrates how shingles are generated from an HTML sequence, according to an embodiment of the invention.

Techniques are described to hierarchically organize structurally similar documents from a web site. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Web servers generate documents for a web site, often from a fixed set of templates. For example, when a web document is based upon JavaServer pages ("jsp"), Active Server Pages ("asp"), or PHP: Hypertext Preprocesser pages ("php"), which are all server-side scripting languages, the documents generated from these templates may be structurally similar. For example, the template written in one of the scripting languages may instruct the number of times a tag occurs within a document and the tag's position within the document. Thus, when the same template and server side code is used to generate web documents for a particular web site, the structure of the web documents are often similar.

Determining structural similarity may be accomplished by determining the positions of where the tag occurs within a document while ignoring the number of times a tag occurs. Taking into account only the number of times a tag occurs has a higher probability of giving a false result. For instance, in a situation where a large table with a specified number of rows exists in two documents, the number of tags in the two documents would be similar and so the documents may appear structurally similar based only upon the number of tags. But if tag position and the type of tags in the documents are different, then the two documents are not structurally similar. As a result, structural similarity is based upon the positions of the tags within the documents.

In order to use one of the applications such as wrapper induction as an extraction method for information from documents from a web site, the documents are first placed in groups based upon structural similarity. Any type of semi-structured documents may be grouped based upon their structural similarity. In an embodiment, a document is structurally similar to another document if the tags and positions of the tags in the documents are similar. For example, if the documents are HTML web pages, then the similarities would be based upon the HTML tags. If the documents are XML pages, then the similarities would be based upon XML tags. In SGML pages, the similarities are based upon SGML syntax. For LaTeX documents, most often seen with academic papers and theses, the similarities are based upon the declarations of the LaTeX document.

Rather than identifying structurally similar web documents manually, an automated process is employed wherein the structures of documents are fingerprinted and clustered. Fingerprinting, as used herein, refers to any information extraction method or feature generation method to generate data structures or "fingerprints" that represent the structure of a document. The fingerprints are based on the sequence of the tags in the document. These fingerprints are generated and then clustered based on a specified similarity. Finally, one of the applications such as wrapper induction is performed in order to extract information from the document. The information may then be re-arranged and re-distributed to users.

Grouping structurally similar web documents and then extracting and managing information has other useful applications. For example, an effective method to insert advertisement offers in a web document entails understanding the content of the web documents and then matching the relevant offer in order to accurately target the correct audience. One method would be to cluster web documents based on content, assign broad topics to the documents, and then target offers to documents based on the topics of the cluster. A more effective method is to group the structurally similar documents and then extract the information. In this way, a more accurate section of the site in which to place the advertisements is found rather than placing advertisements based on the broad topic.

Grouping structurally similar documents also removes "noisy" content from a group of documents. As used herein, "noisy" content refers to content in a document that does not contribute to determining the content of the document. For example, noisy content might be a copyright notice in a document. The copyright notice only serves notice that the document is copyrighted but contains no information that helps determine the subject matter of the document. Other examples of noisy content include, but are not limited to, navigation panels and advertisements. By grouping structurally similar documents, the noisy content may be identified and ignored.

Other applications for grouping structurally similar documents include, but are not limited to, classifying documents into predefined classes, the de-duplication of documents, and XML retrieval. Classifying documents based upon some criteria, such as documents related to travel or products, allow one to help determine the relevance of the documents. Structurally similar documents grouped together have a high probability of falling under a single predefined class and thus may be used to classify the documents. Many documents may also be duplicated on the Internet. Grouping structurally similar documents helps to identify these duplicated documents so that duplicated documents may be removed from further processing. Finally, in XML retrieval, information is retrieved from XML documents so that information from those documents may be extracted and managed to become more widely available.

In an embodiment, grouping techniques for structurally similar documents may be based only on the fingerprints. In another embodiment, documents of a web site may be arranged in a hierarchical organization, also referred to herein as a "site map," based on the URL and the fingerprints of the documents.

By using only the URLs and shingles of the documents in grouping, scalability and performance are extremely high. The information to be processed is far less than would be encountered if all of the HTML coding were considered. Thus this light-weight method for grouping structurally similar pages may be scalable to all the domains located on the Internet.

Placing URLs and the fingerprints of documents in a hierarchical organization assists in aggregating information and features of the documents. For example, each URL may be represented as a set of features. A feature might be the relevant keywords from the content of the document of the URL. In an embodiment, an aggregation function aggregates these features up a hierarchy in a bottom-up fashion. In a bottom-up aggregation, URLs and their corresponding features are aggregated first at the leaf nodes of the hierarchy. The features aggregated at the leaf nodes are then used to aggregate up the hierarchy.

One application of the hierarchical organization would be to aggregate "spaminess" of a domain. As used herein, "spaminess" refers to how relevant or not relevant a domain is from the perspective of a search engine. By employing aggregation with the hierarchy, identification may be made of sections of the hierarchy (or website) that are relevant and sections of the hierarchy that are not relevant.

Fingerprinting to Find Similarity

Fingerprinting generates data structures, also referred to herein as "shingles," that represent the structure or content of a document. Comparing these shingles quickly determines the approximate structural similarity between documents. Shingles represent permutations of common sub-sequences in a document. As such, shingles capture each unique ordering of sequences in a document and are ideally suited to capture repeating sections of documents. For example, if a document has ten rows of a table, and if another document with the same placement of tags has four rows of the same table, then the shingles generated for each of the documents would be identical.

In an embodiment, the tags, such as HTML tags, of the document are arranged as a sequence. This is seen in FIG. 1. The HTML tags 101 (or other types of tags depending upon the type of semi-structured document) are extracted. All other content is removed. An HTML tag comprises the tag and an optional attribute. For example, a tag may be "<HTML>." A tag may also contain an attribute, such as in the example "<img src='Image.gif'>". In this example, the HTML tag is "<img>" and the attribute is "src='image.gif'."

In an embodiment, each of the HTML tags are then encoded using an encoding technique. The actual encoding techniques may vary from implementation to implementation, but may include MD5 or SHA-1. The encoding of each tag is fit into a byte and the attributes of the tag are encoded to fit into the subsequent byte. This results in a fixed width representation of the tag and its attributes. In other embodiments, the encoding may be placed into a specified number of bytes for each tag and the tag's attribute.

In an embodiment, the shingles are then generated using windowing and hashes. Windowing refers to dividing data into data segments of a particular size. For example, referring back to FIG. 1, there is a sliding window 103 of a particular size. The window slides across the encoded HTML tags with a second window 105 slightly overlapping the first window 103. There is also a third window 107 displayed which slightly overlaps the second window 105. These windows of data segments cover the entire encoded HTML sequence. The size of the window may vary from implementation to implementation, with more windows used if the window size is small, and less windows used if the window size is larger. In other embodiments, the sliding windows do not overlap.

In an embodiment, a specified number of independent hash functions are computed for each of the data segments located in each window. In FIG. 1, "$h_1^1, h_2^1, \ldots, h_8^1$" 109 are the values for the independent hash functions for the first window 103. Additionally, "$h_1^2, h_2^2 \ldots, h_8^2$" 111 are the values for the independent hash functions for the second window 105. And finally, "$h_1''', h_2''' \ldots, h_8'''$" 113 are the values for the independent hash functions for the $n^{th}$, or last, window.

In an embodiment, the minimum hash value, or shingle, across all of the windows for each of the specified hash functions is retained as the fingerprint for that particular hash function. FIG. 1 shows a total of eight minimum shingles computed for the web document, though the total number of shingles calculated for web documents may vary from implementation to implementation. The minimum shingle for the first independent hash function is $Sh_1$ 115. The minimum shingle for the second independent hash function is $Sh_2$ 117.

In an embodiment, the minimum shingles for each of the hash functions are determined and stored for the document. The shingles of a document are then compared to the shingles of another document in order to determine the structural similarity between the two documents. In another embodiment, the maximum shingles, or highest hash value, across all of the windows for each of the specified hash functions are retained as the fingerprint for the document. In yet another embodiment, the selection of the shingles retained as the footprints is based on any type of selection process and may vary depending upon the implementation.

DOM Model and Fingerprinting

Figure 2B:
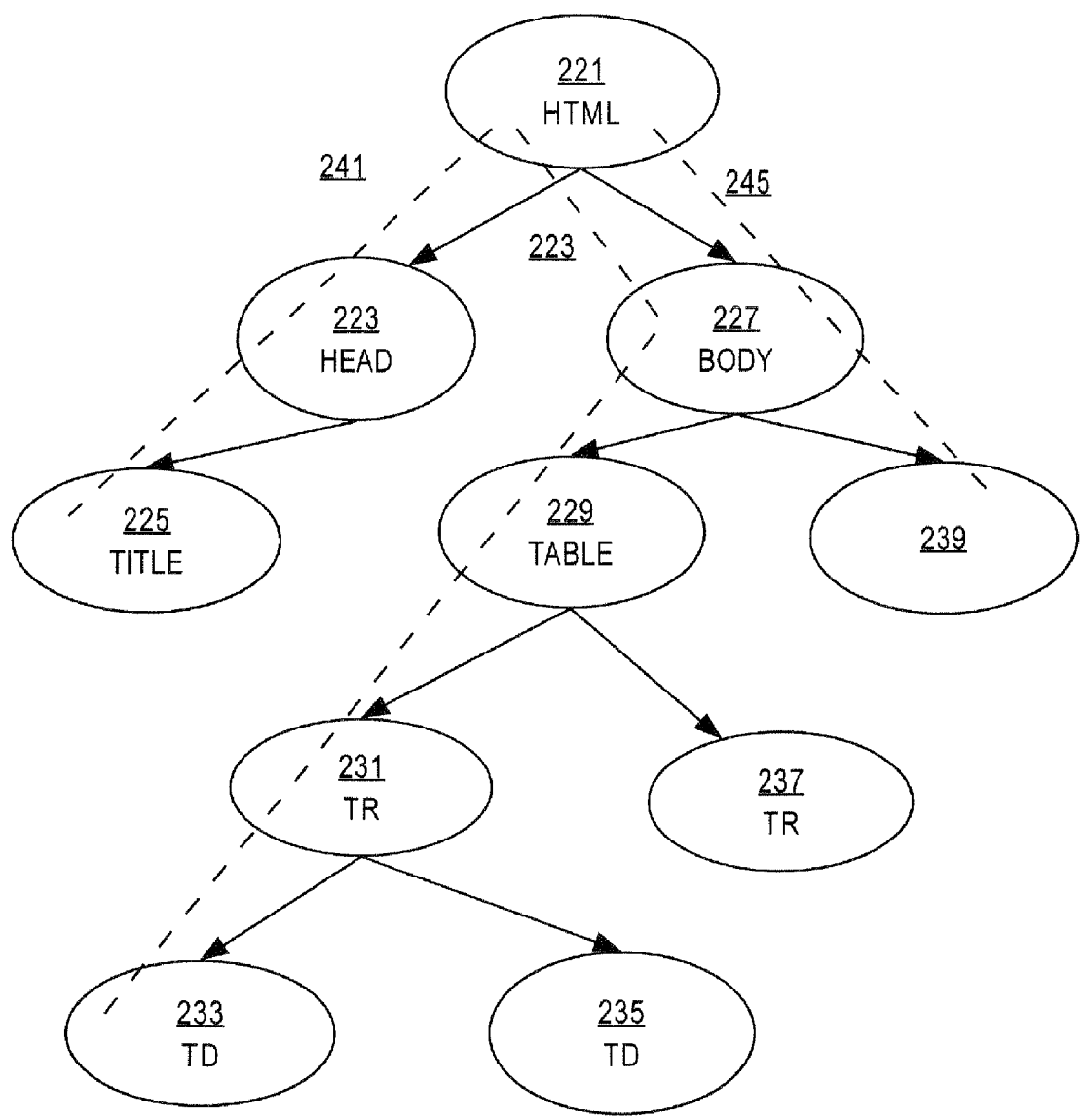
FIG. 2B is a diagram of a DOM tree representation of the HTML page illustrated in FIG. 2A, according to an embodiment of the invention.

In an embodiment, the sequence of HTML tags may be replaced using the paths derived from the available paths of a Document Object Model ("DOM") representation of the web document. An example of HTML tags is shown in FIG. 2A. A DOM representation of those HTML tags is shown in FIG. 2B. FIG. 2A illustrates a simple document comprising a set of HTML tags. The page begins with "<HTML>" tag 201 signifying that the document is an HTML page. Tag 201 indicates the start of the HTML page. The tag "<HEAD>" 203 indicates that header information is next. Within the "<HEAD>" tag 203 is the tag "<TITLE>" 205, which states the title of the document and displays the title in the caption of a web browser. The text between the "<BODY>" tags 207 is displayed in the web browser. In the HTML page of FIG. 2A, "<TABLE>" tag 209 indicates that a table is shown. The table is divided into "<TR>" tags, or table row tags 211 and 217, and the table rows are divided into "<TD>" tags or data cell tags 213 and 215.

In an embodiment, a DOM representation of a document defines the logical structure of the document into a tree-like structure. A DOM representation of the HTML page from FIG. 2A is shown in FIG. 2B. Each node in the DOM tree represents a tag. "HTML" node 221 is the root node of the DOM tree. One level below the root node are "HEAD" node 223 and "BODY" node 227. This corresponds with the HTML page of FIG. 2A, in which "<HEAD>" tag 203 and "<BODY>" tag 207 are positioned within "<HTML>" tag 203 in the HTML page. "TITLE" node 225 falls under "HEAD" node 223 because "<TITLE>" tag 205 is located within "<HEAD>" tag 203. One level below "BODY" node 227, "TABLE" node 229 indicates a table and node 239 is an empty node that may represent any tag. One level below "TABLE" node 229 are "TR" nodes, or table row nodes 231 and 237, because a table is divided into table rows. Below the "TR" node or table row node 231 are "TD" nodes or data cell nodes 233 and 235, because table rows are further divided into data cells.

In an embodiment, paths from the DOM tree representation are represented as a sequence. For example, there are three paths delineated with a dashed line in FIG. 2B. Path 241 is "|HTML/HEAD/TITLE|." Path 243 is the path "|HTML/BODY/TABLE/TR/TD|." Path 245 is "|HTML/BODY/ . . . |." Other paths may be generated. The length of the path may vary based upon the size of the DOM tree and the implementation.

In an embodiment, each path sequence is encoded using a standard encoding technique to have a fixed width representation of the path. The encoding technique may vary based upon the implementation, but may include MD5. Once a fixed-width representation of the paths is generated, then shingles are computed using windows and hash functions as described in the section above. Each unit of the fixed-width representation is a path. All units within a window are computed to generate a hash value. Then, any selection method may be used to select the shingles to be used as the fingerprints for the document.

Because the shingles are generated from the specified independent hash functions, the approximate structural similarity between any two documents may be found by performing a direct comparison amongst the shingles. Comparing shingles to discover the similarity between documents is further described in U.S. Pat. No. 6,119,124, entitled "Method for Clustering Closely Resembling Data Objects" by Andrei Broder, Steve Glassman, Greg Nelson, Mark Manasse, and Geoffrey Zweig, which is incorporated by reference herein.

In an embodiment, the shingles are grouped together if a specified number of the shingles match. This varies the level of similarity required to create a match. For example, if all eight shingles must match in order to group documents, then this signifies an extremely high level of similarity. If only four out of the eight shingles need to match in order to group the documents, then the level of structural similarity is lower. The same shingles also do not need to match in every instance. One of the shingles may be masked so that if any seven shingles from one set of fingerprints match any seven shingles from another set of fingerprints, then the documents are grouped.

Any clustering technique may be used on the shingles to group structurally similar documents. However, using a clustering technique based upon only the shingles may result in the grouping of documents that were generated from different templates because the documents have a similar structure. This results in the extraction algorithm not being able to extract any relevant information from the documents.

Creating a Hierarchical Organization of the URL and Shingles

Figure 3:
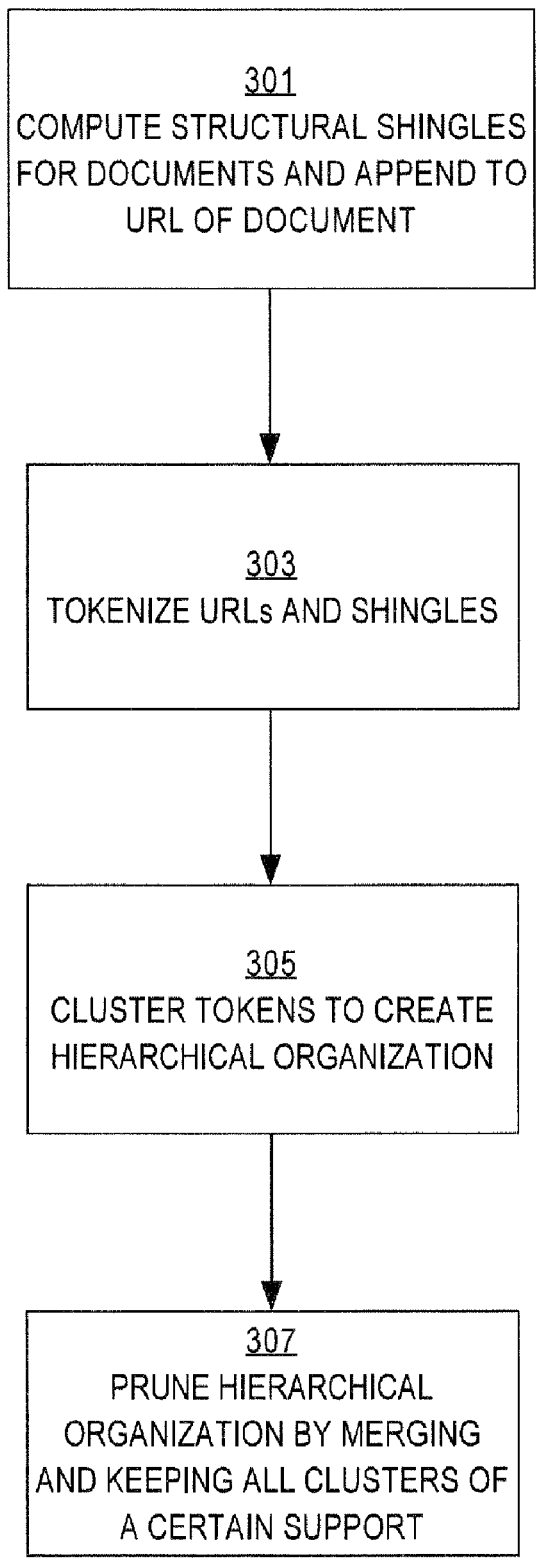
FIG. 3 is a flowchart diagram of a technique to hierarchically organize structurally similar documents from a web site, according to an embodiment of the invention.

In one embodiment of the invention, in order to ensure that structurally similar documents are not grouped incorrectly, hierarchical clustering is used. FIG. 3 shows an overview of the steps to create a hierarchical organization of structurally similar documents from a web site, according to an embodiment. In step 301, the fingerprints, or shingles, of the documents are computed and appended to the corresponding URLs of the documents. Next, as shown in step 303, the appended URLs with the shingles are tokenized. In step 305, the tokens are clustered to create a hierarchical organization, or site map. Finally, in step 307, in order to reduce the memory requirements and increase the speed of searches, the site map is pruned by merging nodes and removing all clusters that do not reach a specified level of support.

A technique to create a hierarchical organization is further explained in U.S. patent applications entitled, "Techniques for Clustering Structurally Similar Web Pages," and, "A Method for Normalizing Dynamic URLS of Web Pages Through Hierarchical Organization of URLS from a Web Site," which are incorporated herein by reference.

A URL comprises a static component, a script name, and parameters. Parameters are encoded as keys and values. Parameters are separated by ampersands. An example of a URL is:

http://shopping.foo.com/
    product.php?cat="electronics"&prod_id="13"&
    session_id="daef"

In this example, the static component of the URL is "http://shopping.foo.com/" and the script name is "product.php." The query parameters, which begin after the "?" in the example, are "cat='electronics,'" "product_id='13,'" and "session_id='deaf.'" For the first query parameter, "cat" is the key and "electronics" is the value. For the second query parameter, "product_id" is the key and "13" is the value. Finally, the key for the third query parameter is "session_id" and the value is "deaf."

In an embodiment, the fingerprints of a document are appended as parameters to the URL of the document to create modified URLs. Appending the fingerprints to the URL is performed for all documents of a web site. In an embodiment, the shingles may be grouped together to form a single parameter. If there are eight shingles being stored, then rather than storing each shingle as a parameter and having eight separate parameters, the shingles are grouped into a single parameter if their values match.

In another embodiment, the shingles are grouped together if a specified number of the shingles match. Depending on the level of similarity necessary to create a match, shingles are grouped to form masked shingles. If there are eight distinct shingles and the level of similarity is a match of seven out of the eight shingles, then seven combinations of the eight shingles are computed to form a total of eight masked shingles. For example, eight shingles might have the values "0e," "a1," "e0," "00," "82," "10," "ff," and "c53." Under this circumstance and if the level of similarity is a match of seven out of eight shingles, then the number of masked shingles would be the combination, $^8C_7$. $^8C_7$ is equal to eight and the eight masked shingles would be "0ea1e0008210ff," "a1e0008210ffc53," "0ee000821ffc53," "0ea1008210ffc53," "0ea1e08210ffc53," "0ea1e00010ffc53," "0ea1e00082ffc53," "0ea1e0008210c53," and "0ea1e0008210ffc53." Using masked shingles thus helps in reducing the number of clusters or nodes formed in the hierarchy.

Figure 4:
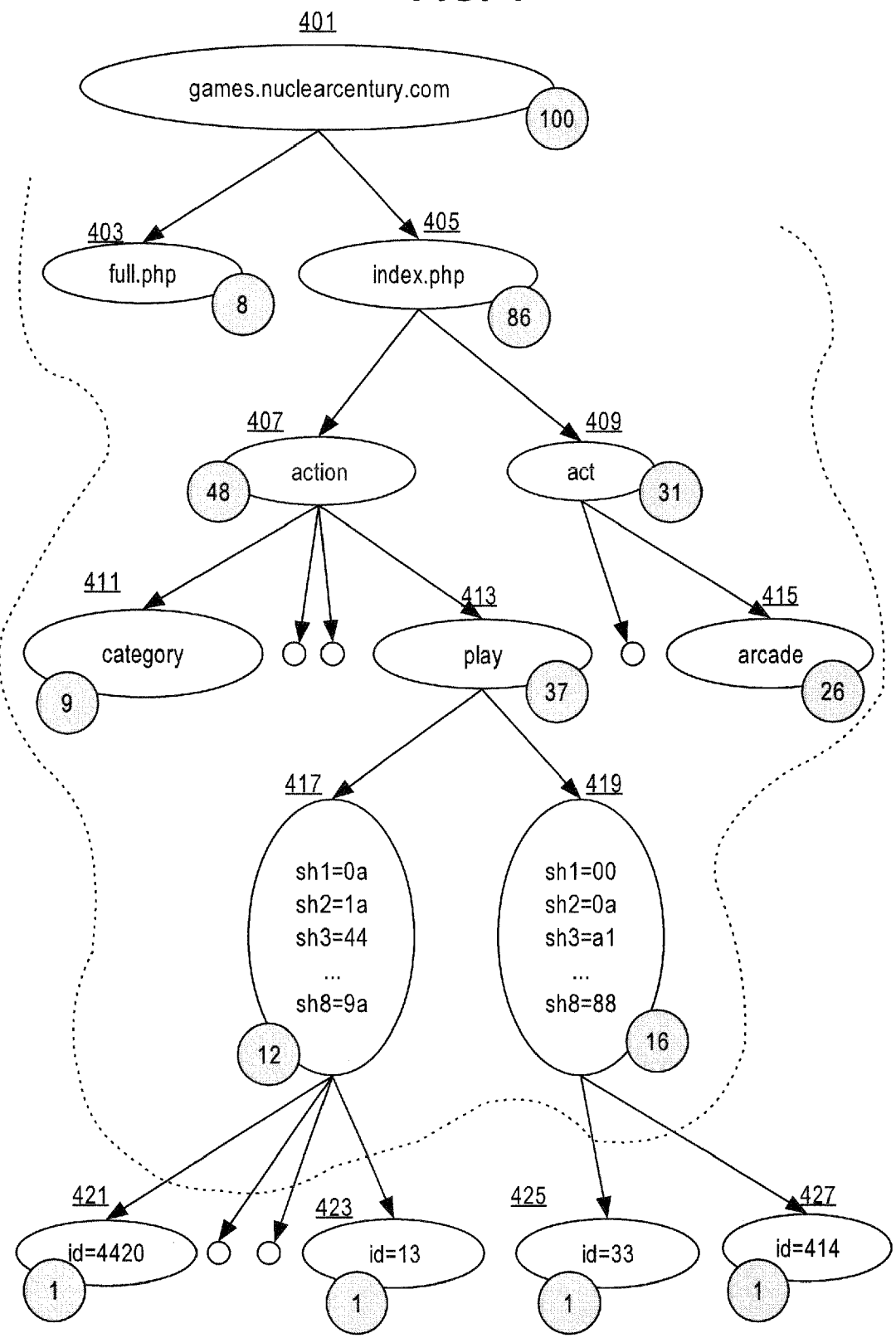
FIG. 4 is a diagram of a hierarchical organization with structurally similar documents of a web site, according to an embodiment of the invention.

In an embodiment, a hierarchical organization of document URLs is made. Each node in the hierarchy represents a token. An example of this is shown in FIG. 4. A token in a node co-occurs with tokens in that node's parent and children. Tokens higher up on the hierarchy are more informative than those below where informative may be based on criteria such as, but not limited to, support, entropy, or some such measure employed in Information Theory. Further information on Information Theory may be found in the reference, "A Mathematical Theory of Communication" by C. E. Shannon (*Bell System Technical Journal*, vol. 27, pp. 379-423, 623-656, July, October, 1948), which is incorporated by reference in its entirety, herein. The example under consideration in FIG. 4 considers support as the criteria. The domain "games.nuclearcentury.com" 401 occurs more frequently, or in 100 URLs as shown in the grey circle connected to the node, than token "index.php" 405 which is lower on the hierarchy and occurs in 86 URLs. Each node comprises information such as, but not limited to, (a) the number of URLs and (b) a list of URLs belonging to that node. A URL is said to belong to a node if the URL contains the token defined at that node.

In an embodiment, the URL is first tokenized based on various separators that may include, but are not limited to, the symbols "/" and "&." The tokens of the URL are then clustered in such a way that the order of the directory is retained. Directories with low support, or having a low occurrence in the website, are clustered into another category named "others". As used herein, "support" of a token in the URL is the minimum number of URLs from that site that have the same token. The sub-domain name, hostname, and directories are tokenized and clustered in cases where there is adequate support.

Clustering and Pruning

In an embodiment, the URLs with appended shingles are rearranged and clustered with the parameters as levels and values as the splitting criteria. Thus, parameters with more support of occurrence and low variance in value are clustered at a higher level node than parameters with low support and high variance in their values. This provides a method for determining the importance of each parameter in the URL.

Pruning the site map removes nodes that do not determine or influence the structure of the web document. In one embodiment, nodes clustered below "shingle nodes," or those nodes containing the shingles as parameters, are removed. If URLs are associated with the same shingle node, then these associated URLs have similar structure. Parameters that exist a level below the shingle node have little relevance to the structure of the web page and may be removed. Removing irrelevant parameters, or parameters that do not alter the behavior of the web server that serves the page, helps reduce the memory footprint of the hierarchical organization.

In an embodiment, pruning is performed by traversing the cluster tree from its root and identifying nodes to merge. Nodes are merged if they are found to be similar based upon various criteria. In support-based merging, clusters with lower support are merged with their siblings to obtain higher occurrence clusters. In pattern-based merging, URLs with web pages of similar structure are merged into a cluster. Nodes may also be merged based on the number of common shingles. Similarly structured pages share respective shingles. Pruning based on the number of common shingles controls the homogeneity of the clusters.

To merge nodes, the nodes, along with their sub-trees, are merged into a single merged cluster node. The information of the merged nodes and their respective sub-trees are aggregated at the merged node level. The sub-tree under the merged node may be preserved or discarded depending upon the needs and the requirements of the application.

In an embodiment, the hierarchical organization is stored as a suffix tree or prefix tree index. Both of these data structures allow for the fast implementation of string operations. Storing the organization in a prefix tree allows linear-time mapping of URLs to clusters.

Example of a Hierarchical Structure

To better understand the technique of clustering URLs, an example of the site "http://games.nuclearcentury.com" is presented. This web site has games organized by the parameters "category," "id," and "reviews." A set of sample URLs from the site is as follows:

```
http://games.nuclearcentury.com/full.php?id=6186
http://games.nuclearcentury.com/full.php?id=6187
http://games.nuclearcentury.com/full.php?id=6188
http://games.nuclearcentury.com/index.php
http://games.nuclearcentury.com/index.php?act=Arcade&do=newscore
http://games.nuclearcentury.com/
  index.php?action=category&id=%3C?=3?%3E&page=0
http://games.nuclearcentury.com/
  index.php?action=category&id=%3C?=7?%3E&page=0
http://games.nuclearcentury.com/index.-
  php?action=category&id=&page=0&order2=gId&sby=DESC&submit=Go
http://games.nuclearcentury.com/index.php?action=
  category&id=&page=0&order2=gName&sby=ASC&submit=Go
http://games.nuclearcentury.com/index.-
  php?action=category&id=1&page=0&order2=game_name&sby=ASC
http://games.nuclearcentury.com/index.php?action=
  category&id=1&page=0&ppage=20&order2=game_name&sby=ASC
http://games.nuclearcentury.com/index.-
  php?action=category&id=1&page=1&order2=game_name&sby=ASC
http://games.nuclearcentury.com/index.-
  php?action=category&id=1&page=10&order2=game_name&sby=ASC
http://games.nuclearcentury.com/index.-
  php?action=category&id=1&page=12&order2=game_name&sby=ASC
http://games.nuclearcentury.com/index.php?id=4397&action=play
http://games.nuclearcentury.com/index.php?action=play&id=4398
http://games.nuclearcentury.com/index.php?action=play&id=4399
http://games.nuclearcentury.com/index.php?action=play&id=4417
http://games.nuclearcentury.com/index.php?id=4419&action=play
http://games.nuclearcentury.com/index.php?action=play&id=4420
http://games.nuclearcentury.com/index.php?action=play&id=4421
http://games.nuclearcentury.com/index.php?action=play&id=4423
http://games.nuclearcentury.com/index.php?action=play&id=4424
```

Shingles are calculated based on the structure of the documents using techniques described above. The shingles for a particular web document are then appended to the URL of that particular web document as parameters and values. For example, given the following URL:

http://games.nuclearcentury.com/
      index.php?action=play&id=4424

The structural shingles are generated and then appended to the URL to create:

```
http://games.nuclearcentury.com/index.php?action=play&id=4424&sh1=
0e&sh2=a1&sh3=e0&sh4=00&sh5=82&sh6=10&sh7=ff&sh8=c53a
```

FIG. 4 is an illustration showing a hierarchical organization generated after clustering the URLs from the domain "games.nuclearcentury.com" after appending the structural shingles. The domain "games.nuclearcentury.com" 401 is at the root of the hierarchical organization and is associated with 100 URLs as shown in the small grey circle connected to the node. On the next level is node "full.php" 403 and node "index.php" 405, which are script names. One level below the script names are the parameter keys. Node "action" 407 is associated with 48 URLs. Node "act" 409 is associated with 31 URLs. A level below are values of the parameters, with node "category" 411, node "play" 413, and node "arcade" 415. Next are the shingle nodes at 417 and 419. These shingle nodes are grouped together as a single node rather than keeping each shingle separate. These shingle nodes may be grouped based on a specified number of matching shingles. Any nodes below the shingles represent parameters that are not relevant. These nodes are removed. These nodes are node "id=4420" 421, node "id=13" 423, node "id=33" 425, and node "id=414" 427. These parameters are only associated with a single URL and so do not meet the necessary support level of at least 8 URLs (in one embodiment of the invention). Thus, these nodes would be pruned. In addition, FIG. 4 displays a dotted line indicating a support border. Any node located outside of the dotted line is removed.

Because nodes below the shingle nodes are pruned, the cluster at the shingle node now has the URLs that are structurally similar to the extent of the specified number of matching shingles. By specifying the number of singles that match, the homogeneity of the clustering is controlled. Furthermore, employing hierarchical clustering guarantees that documents from different sections of a large web site are not merged incorrectly.

Clustering Using Other Criteria

In an embodiment, web documents are grouped according to other criteria. As used herein, "criteria" and "criterion" refer to any categories or description that may be used to organize and group any type of web document. For example, the web documents might be grouped by the content located in the web document, the types of media located in the web document, or structure as described above. In addition, the grouping may be a combination of different criteria and may include any sort of categories or descriptions upon which grouping and clustering may be performed.

In another embodiment, once the web documents are grouped by a specified criterion or multiple criteria, the clustered web documents may or may not be further placed into a hierarchical organization. For example, if the grouping of the web documents by content is deemed to be sufficient for the particular application, then the further steps of placing the clustered web documents into a hierarchical organization need not be completed. In another embodiment, the clusters grouped by a specified criteria are placed into a hierarchical organization because of a higher priority on accuracy of the clustering.

Hardware Overview

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to storage media and transmission media. Storage media includes both non-volatile media and volatile media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method to organize structurally similar Uniform Resource Locators (URLs, the method comprising:
   for each particular document of a plurality of documents, performing particular steps comprising:
   generating one or more shingles that represent a structure of the particular document;
   generating an appended URL for the particular document by appending, to a URL of the particular document, a sequence of parameters and values of those parameters, wherein the sequence includes a separate parameter for each shingle of the one or more shingles generated for the particular document, and wherein the value of each parameter is the value of a shingle to which that parameter corresponds;
   tokenizing the appended URL into components based on delimiters present in the appended URL; and
   adding the components produced by said tokenizing to a total set of components for the plurality of documents;
   after performing said particular steps for each particular document of the plurality of documents, clustering the components from the total set of components into a hierarchical organization by, for each particular component of the total set of components that does not occur at the beginning of any appended URL, setting that particular component to be a child, in the hierarchical organization, of another component that occurs immediately before the particular component in an appended URL in which the particular component occurs; and storing the hierarchical organization.

2. The method of claim 1, wherein documents are any semi-structured documents.

3. The method of claim 1, wherein documents are HTML web pages.

4. The method of claim 1, wherein documents are SGML pages.

5. The method of claim 1, wherein documents are XML pages.

6. The method of claim 1, wherein documents are LaTeX pages.

7. The method of claim 1, wherein clustering further comprises pruning the hierarchical organization to a specified level by removing, from the hierarchical organization, all components that descend from nodes that represent shingles.

8. The method of claim 1, wherein the structure of the particular document is based upon HTML tags of the document, and further comprising:

prior to generating the one or more shingles that represent the structure of the particular document, removing, from the particular document, all data except for HTML tags.

9. The method of claim 8, wherein the structure further comprises a fixed width representation of the HTML tags.

10. The method of claim 1, wherein the structure of the particular document is based upon paths of a DOM tree representation of the particular document, and wherein generating the one or more shingles that represent the structure of the particular document comprises performing, for each path that occurs in the DOM tree, steps comprising:

generating a tag sequence of tags that occur in the path, wherein the tag sequence only includes tags that occur in the path in the order in which tags occur in the path;

encoding the tag sequence to produce a string that is of a specified fixed width; and adding the string to a set of strings generated for the particular document;

wherein generating the one or more shingles that represent the structure of the particular document is performed by generating the one or more shingles from the set of strings generated for the particular document.

11. The method of claim 1, wherein the hierarchical organization is a prefix tree.

12. The method of claim 1, wherein the hierarchical organization is a suffix tree index.

13. The method of claim 1, wherein clustering the data structures further comprises matching a specified number of the data structures.

14. The method of claim 1, wherein clustering the first components further comprises merging siblings of the hierarchical organization.

15. A non-transitory machine-readable storage medium storing one or more sequences of instructions which, when executed by one or more processors, causes the one or more processors to perform the method recited in claim 1.

16. A non-transitory machine-readable storage medium storing one or more sequences of instructions which, when executed by one or more processors, causes the one or more processors to perform the method recited in claim 2.

17. A non-transitory machine-readable storage medium storing one or more sequences of instructions which, when executed by one or more processors, causes the one or more processors to perform the method recited in claim 3.

18. A non-transitory machine-readable storage medium storing one or more sequences of instructions which, when executed by one or more processors, causes the one or more processors to perform the method recited in claim 4.

19. A non-transitory machine-readable storage medium storing one or more sequences of instructions which, when executed by one or more processors, causes the one or more processors to perform the method recited in claim 5.

20. A non-transitory machine-readable storage medium storing one or more sequences of instructions which, when executed by one or more processors, causes the one or more processors to perform the method recited in claim 6.

21. A non-transitory machine-readable storage medium storing one or more sequences of instructions which, when executed by one or more processors, causes the one or more processors to perform the method recited in claim 7.

22. A non-transitory machine-readable storage medium storing one or more sequences of instructions which, when executed by one or more processors, causes the one or more processors to perform the method recited in claim 8.

23. A non-transitory machine-readable storage medium storing one or more sequences of instructions which, when executed by one or more processors, causes the one or more processors to perform the method recited in claim 9.

24. A non-transitory machine-readable storage medium storing one or more sequences of instructions which, when executed by one or more processors, causes the one or more processors to perform the method recited in claim 10.

25. A non-transitory machine-readable storage medium storing one or more sequences of instructions which, when executed by one or more processors, causes the one or more processors to perform the method recited in claim 11.

26. A non-transitory machine-readable storage medium storing one or more sequences of instructions which, when executed by one or more processors, causes the one or more processors to perform the method recited in claim 12.

27. A non-transitory machine-readable storage medium storing one or more sequences of instructions which, when executed by one or more processors, causes the one or more processors to perform the method recited in claim 13.

28. A non-transitory machine-readable storage medium storing one or more sequences of instructions which, when executed by one or more processors, causes the one or more processors to perform the method recited in claim 14.

* * * * *